3,399,718
STEAM OPERATED HOT WATER HEATER
James A. Phillips, Jr., Quantico, Md., assignor of thirty percent to James A. Phillips, Sr., and Leah M. Phillips, jointly, Quantico, Md.
Filed Feb. 8, 1965, Ser. No. 431,018
7 Claims. (Cl. 165—39)

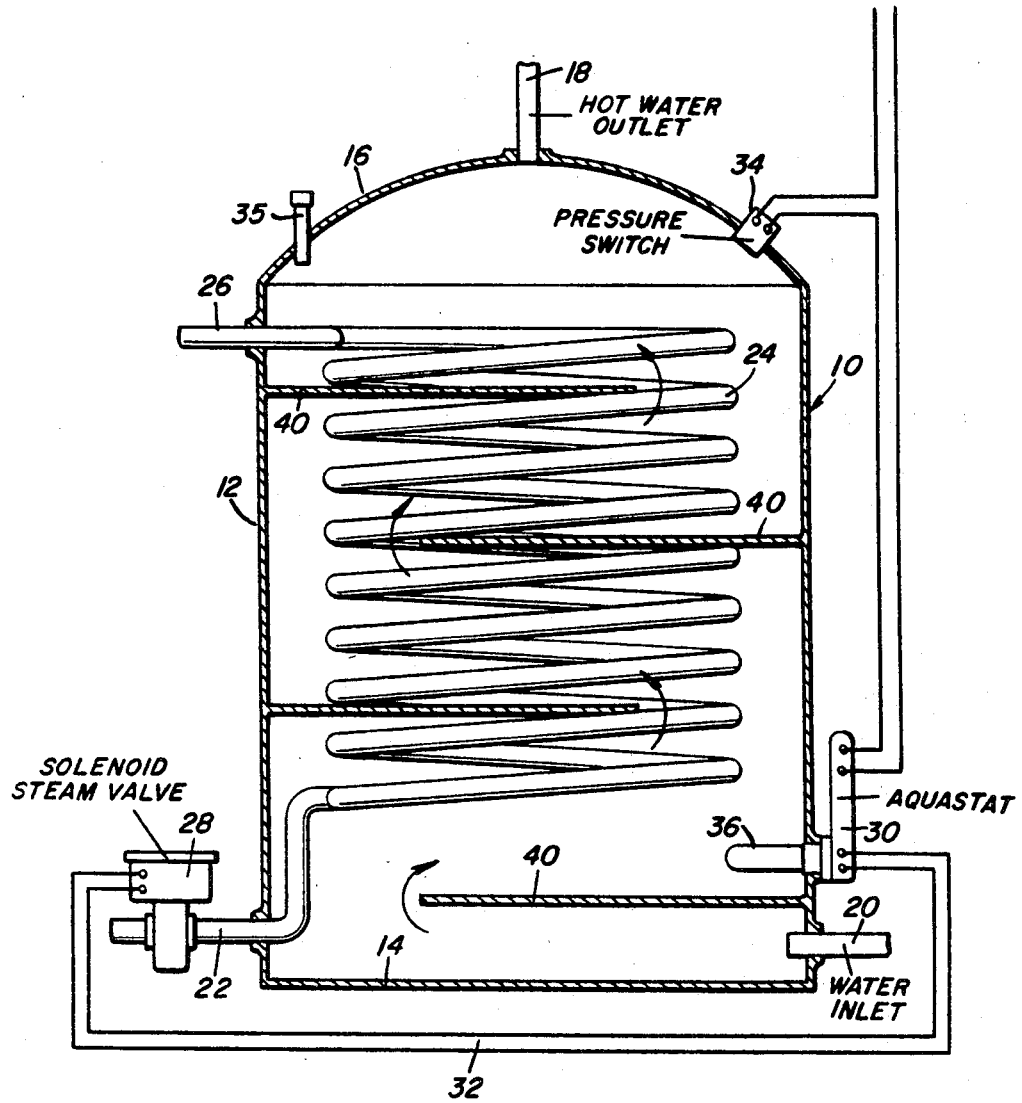

This invention relates to hot water heaters and in particular to hot water heaters which employ the use of steam in heating the water within the hot water heater.

Steam hot water heaters are known in the art; however these steam hot water heaters employ a steam trap in conveying the steam through the hot water heater. It is a primary object of this invention to eliminate the use of a steam trap as has been previously employed.

The steam hot water heater of this invention operates on low or high pressure steam. This steam hot water heater is designed primarily for industrial use where large quantities of water may be withdrawn from the hot water heater at one time. The hot water heater of this invention is capable of producing large volumes of water at a constant temperature. It is capable of supplying large volumes of water as desired economically and feasibly.

In the hot water heater of this invention steam is supplied to a coil, which winds helically through the central part of the hot water heater, from a steam supply outside of the hot water heater. The steam passes from a steam supply into the coil within the hot water heater through a solenoid steam valve. This solenoid steam valve is electrically connected to a thermal responsive aquastat which is responsive to temperatures within the hot water heater. The solenoid steam valve is adapted to be opened or closed by the aquastat according to demands made by the temperature of the water within the hot water tank. When the temperature of the water within the hot water tank reaches a predetermined degree (e.g., 190° F.) the aquastat will respond to these thermal conditions and break the circuit between the aquastat and the solenoid steam valve thereby closing the steam valve and cutting off the supply of steam to the coil. Therefore, the temperature of the water within the hot water tank is in effect controlled by the steam, and conversely the flow of steam through the hot water heater is controlled by the temperature of the water within the hot water heater.

It is a further object of this invention to provide a switching means for controlling the pressure of the water within the hot water heater in addition to the conventional pop off valves found in other hot water heaters. The pressure switch will cut all electricity off when the pressure within the water tank goes 10 pounds above the normal city water line pressure. The electric solenoid valve is designed to close and shut off the supply of steam to the interior of the hot water heater when the electricity thereto is cut off. Therefore, the supply of steam is shutdown when the pressure within the hot water tank reaches a pressure of 10 pounds above the line pressure, or when the water within the hot water heater reaches a predetermined temperature (e.g., 190° F.). The solenoid steam valve is designed to open when the water within the hot water tank drops to a temperature below a predetermined degree. When this occurs the aquastat in response to such temperature conditions will be effected to open the solenoid steam valve through the electrical circuitry connected therewith.

Steam enters the heating coil tubing in the hot water heater adjacent the bottom thereof at whatever steam pressure is available to the device. As the steam passes through the coils of the tubing within the tank body of the hot water heater the steam will condense into water, however, the pressure of the steam behind the condensate forces the condensate to the top of the hot water heater and out of the end of the tubing to be returned to a place where the condensate can be reheated, but before the water or condensate discharges from the end of the tubing to thereafter be returned, further steam condensation will take place and this will be adequate to hold back the steam, which is coming into the coil at the steam inlet thereby preventing such steam from just blowing through the coils. The condensate will form a self-replenishing water column in the tubing. This water column as previously explained will be of sufficient head to hold the steam back and eliminate the steam trap that is used in other pressure steam applications. The coil within the hot water heater and the water held within the tank are in thermal heat exchanging relationship so that the water or condensate that emits from the end of the tubing into the return will be substantially lower than the temperature of the water being heated in the tank. Since a steam trap is not employed in this invention steam will be allowed to rapidly enter the coil through the solenoid steam valve, and will form condensate within the coil thereby forming a water column which will be of sufficient head to hold the steam back as it comes into the coil, however the steam coming into the coil will have sufficient pressure behind it to continuously exhaust the water or condensate from the coil out of the other end of the tubing into the return without any obstructions. The water or condensate returned from the hot water heater of this invention will be piped back to the steam generators or to boiler storage tanks to be reused and reheated to provide steam thereby saving heat loss which would be involved in merely wasting the steam condensate.

It is a still further object of this invention to provide a steam hot water heater which is simple in design, feasible to construct and economical to employ.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The figure illustrates the steam hot water heater of this invention in a front elevational axial cross-sectional view with the coil disposed centrally of the hot water heater and the inlet and outlet thereto shown in full lines, and the solenoid steam valve and aquastat for controlling the flow of steam through the hot water heater together with circuitry therebetween shown schematically.

The steam hot water heater 10 of this invention includes a cylindrical tank 12 having a bottom 14 and a pressure dome 16 and a hot water outlet 18 for providing a conduit for the hot water to be delivered from the hot water heater. A water inlet 20 is shown connected to the bottom of the tank 12 for replenishing water into the hot water tank when hot water has been withdrawn therefrom. The water inlet 20 is preferably provided with a check valve (not shown), as generally required by plumbing codes, to prevent water from flowing out of the tank 12 by way of line 20.

A steam inlet 22 is connected to a generally helical coil arrangement 24 found within the hot water heater and disposed centrally thereof with the axis of the generally helical coil system being vertical. A return conduit 26 is provided in the upper reaches of the tank 12 and is connected to the upper portion of the coil 24 for removing condensate from the coil and returning the water or condensate back to a boiler system or steam generator for replenishing steam to the supply inlet 22. A solenoid steam valve 28 is connected to the inlet conduit 22 and is regulated by an Aquastat 30 which is connected to the tank 12 and is in thermal response to the temperature of the water therein by the use of a temperature sensing bulb 36. An electrical circuit 32 is seen connecting the solenoid steam valve 28 with the Aquastat 30 to thereby regulate the solenoid steam valve 28 in response to temperature changes in the tank. A pressure safety switch 34 is provided in the pressure dome and is responsive to the pressure within the dome and is designed to shut down the system when the pressure within the dome exceeds 10 pounds above water supply line pressure. This pressure switch is used in addition to the conventional pop-off valve 35 normally employed to release excess pressure in the tank to prevent rupture thereof.

The steam operated hot water heater of this invention operates as follows.

Water disposed within the hot water heater 10 and within the cylindrical tank 12 is in thermal exchange relationship with the helical coil 24 which winds up through the central body of the cylindrical tank 12. Steam is adapted to pass through the coil 24 by entering said coil through an inlet conduit 22 found at the bottom of the cylindrical tank 12. Passage of the steam flow through the coil 24 is regulated by the solenoid steam valve 28 which is open and closed in response to the Aquastat 30 also connected to the cylindrical tank 12. The Aquastat 30 is designed to maintain the water held within the hot water heater 10 within a prescribed temperature range. When the water within the hot water heater drops below a predetermined temperature the Aquastat will respond to thermal conditions within the tank 10 to open the solenoid steam valve 28. Once the solenoid steam valve is open steam will flow through the inlet pipe 22 and into the coil 24 and will pass upwardly within the coil 24 towards the top thereof. As the steam proceeds through its path within the coil 24 the steam will cause the temperature of the water within the tank 12 to rise since the steam and the water within the tank 12 are in thermal exchange relation. The temperature of the water within the hot water heater 10 will serve likewise to cool the temperature of the steam rising in the copper coil 24. This will serve to eventually cause condensation of the steam to form condensate within the coil 24 as the steam drops below its vaporization temperature. The heat released by the steam when being condensed will be conducted to the water within the tank 12 thereby raising the temperature of this water. The condensate will form a water column within the coil 24. This condensate will be continuously forced upwardly in the coil 24 to a position at the top thereof where the condensate may be returned through the return conduit 26 to the steam generator units employed to produce the steam used. A sufficient quantity of condensate will be held within the coil 24 to provide a head therein sufficient to contain the steam within the coil and prevent the steam from blowing through the coil and out into the return pipe 26. As the temperature of the water within the tank 12 reaches a predetermined degree within the temperature range prescribed, the Aquastat 30 which is in thermal responsive relation with temperature changes within the tank 12 as indicated at 36 will respond and break the circuit to the solenoid steam valve 28 thereby closing the solenoid steam valve and shutting down the supply of steam to the coil system 24.

In the event that the water temperature within the hot water tank 12 should exceed the predetermined temperature and reach a condition which is considered dangerous, as to the pressure within the tank, a pressure responsive switch 34 would be operated by the pressure within the tank and will break the electrical circuit to cut down the supply of electricity to the Aquastat 30 thereby shutting down the system and closing the solenoid steam valve 28 until pressure within the tank 12 has been lowered below the operating pressure of the switch 34. A plurality of horizontally disposed flat baffle plates 40 may be secured to the interior of the tank 12 to force the water entering through the pipe 20 to follow a sinuous path around the spirals of the helical coil as the water flows toward the outlet 18. Also, the size of the steam orifice is varied to fit the limitations of the steam supply facilities in the particular place where the unit is to be installed, and/or to adapt the unit to particular operating conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hot water tank, means for heating water in said tank, a water inlet pipe projecting into said tank near the bottom thereof, control means provided on said hot water tank adjacent to said water inlet, said control means being adapted to respond to temperature changes within said hot water tank and being electrically connected to a solenoid steam valve, a steam inlet pipe projecting into said tank near the bottom thereof, said solenoid steam valve being connected to said steam inlet pipe and being adapted to close and open the passageway for steam in said steam inlet pipe, a water outlet pipe opening into said hot water tank at an elevation above said inlet pipe, and a steam condensate outlet pipe projecting into said tank near the top thereof, said means for heating water in said tank being connected to said steam inlet pipe and said steam condensate outlet pipe.

2. In a method of heating a body of liquid from which heated liquid is withdrawn at the upper level of said liquid body and such withdrawn liquid is replenished by liquid introduced at the lower level of said liquid body, the improvement which comprises the steps of passing a condensible vaporous fluid in an upward generally helical isolated path of flow in thermal exchange relation with said body of liquid from an inlet at said lower level to an outlet at said upper level, whereby said condensible vaporous fluid forms a condensed fluid, the heat of said condensible vaporous fluid being substantially given up to said body of liquid by said condensible vaporous fluid upon condensation of said fluid in said path of flow, and maintaining the heat of said body of liquid at a substantially constant temperature by maintaining a supply of said condensible vaporous fluid at a temperature above boiling point thereof without said body of liquid and regulating said substantially constant temperature so that said supply of said condensible vaporous fluid can enter said path of flow only when said substantially constant temperature drops below a certain value, and displacing said condensed fluid from said path of flow by the pressure of said vaporous fluid from said supply of condensible vaporous fluid when said condensible vaporous fluid is permitted to enter said path of flow so as to heat said body of liquid to a temperature range corresponding to substantially constant temperature.

3. In a method of heating a body of liquid from which heated liquid is withdrawn at an upper level of said liquid body and such withdrawn liquid is replenished by liquid introduced at a lower level, the improvement which comprises the steps of passing condensible vaporous fluid in a generally helical path of flow in thermal exchange but isolated relationship with the liquid body through a vertical height extending upwardly from said lower level from an inlet at said lower level to an outlet at said upper level, whereby said condensible vaporous fluid forms a condensate in said path of flow, the heat of condensation produced upon condensation of said vaporous fluid in said path of flow being substantially given up to the liquid body, maintaining a supply of said condensible vaporous fluid at a temperature above the boiling point thereof outside of said body of liquid, displacing said condensate in said path of flow by introducing said supply into said path of flow, and regulating the amount of flow of said supply which can enter said path of flow by the temperature of said body of liquid so as to heat said body of liquid to a definite temperature range.

4. In a method of heating a body of liquid from which heated liquid is withdrawn at the upper level of the liquid body and such withdrawn liquid is replenished by liquid introduced at a lower level, the improvement which comprises the steps of passing condensible vaporous fluid in an upward generally helical path of flow separated from the liquid body and in thermal exchange relationship with the liquid body through a vertical height extending upwardly substantially from an inlet at said lower level toward an outlet at said upper level allowing said condensible vaporous fluid to form a condensate, the heat of condensation produced upon condensation of the vaporous fluid in said path of flow being substantially given up to said liquid body, maintaining a supply of said condensible vaporous fluid away from said body of liquid at a place from which such fluid from said supply can enter said path of flow at the lower level thereof, said supply being maintained at a temperature above the boiling point thereof, and displacing said condensate from said path of flow by the vaporous fluid from said supply so as to heat said body of liquid to a predetermined temperature in a definite temperature range, and after said condensate is displaced from said path of flow, flowing the condensate to a source for rejuvenating said supply and reheating said condensate to a temperature above the boiling point thereof.

5. In a method of heating a body of water from which heated water is withdrawn at an upper level of the body of water and such withdrawn water is replenished by water introduced at a lower level, the improvement which comprises the steps of passing steam in an upward path of flow through a tubing coil in thermal exchange relation with the body of water through a vertical height extending upwardly from an inlet at the region of said lower level toward an outlet at said upper level of the body of water, allowing said steam to condense to form condensate, the heat of condensation produced upon condensation of the steam in the path of flow being given up to said body of water, maintaining a body of steam at a place disposed from said body of water from which such steam can enter said path of flow at the lower level thereof and displace said condensate so as to progressively allow the incoming steam in said path of flow to form a condensate to heat said body of water in a definite temperature range, and after said condensate is displaced from said path of flow, flowing the condensate to a source whereat said condensate can be reheated to a temperature above the boiling point thereof.

6. A hot water tank having an outlet therein at an upper level of said tank for withdrawing heated water from said tank and an inlet at a lower level for replenishing the water withdrawn, a coil in said tank coiled through the center of said tank in a generally helical path, a return conduit at an upper level of said tank, a supply conduit at a lower level of said tank, said return conduit and said supply conduit being connected to said coil in flowing relationship to provide a means for flowing a fluid through said supply conduit into and through said coil out of said coil and out of said hot water tank, said coil being adapted to convey steam and condensate therein, said supply conduit being adapted to carry steam therein, and said return conduit being adapted to carry condensate therein, a solenoid steam valve connected to said supply conduit for regulating the flow of steam into said coil, and a thermal responsive means affixed to said hot water tank and being in contact with thermal conditions in said tank, said means opening and closing said solenoid steam valve through an electrical circuit in response to thermal conditions in said tank, whereby said solenoid steam valve is opened to allow steam to flow into said coil thereby heating water in said tank and displacing condensate in said coil from said tank when the temperature of the water in the tank drops to a predetermined level and said solenoid steam valve is closed in response to said means to stop the flow of steam from said source when the temperature of the water in the tank rises to a predetermined degree.

7. The structure as defined in claim 6 whereby a sufficient quantity of condensate will be held within the coil to provide a head therein sufficient to contain the steam within the coil and prevent the steam from blowing through the coil and out into the outlet means, thereby insuring complete condensation of the steam and further heat transfer from the resulting condensate to the body of liquid sought to be heated, thereby insuring utilization of all latent heat of the vaporizable fluid and a substantial portion of the sensible heat of the resultant condensate.

References Cited

UNITED STATES PATENTS

| | | | |
|---|---|---|---|
| 507,633 | 10/1893 | Peck | 122—32 |
| 1,029,631 | 6/1912 | Quiggin. | |
| 1,159,775 | 11/1915 | Kerr | 122—32 |
| 1,270,438 | 6/1918 | Roesch | 122—32 |
| 2,430,837 | 11/1947 | Tutein | 165—39 X |
| 2,967,523 | 1/1961 | Wobbe | 236—17 X |
| 3,071,473 | 1/1963 | Churley. | |

FOREIGN PATENTS 816,894   7/1959   Great Britain.

FREDERICK L. MATTESON, JR., *Primary Examiner.*

ROBERT A. DUA, *Assistant Examiner.*